(12) United States Patent
Reiners et al.

(10) Patent No.: US 11,718,779 B2
(45) Date of Patent: Aug. 8, 2023

(54) NAPHTHENATE INHIBITION

(71) Applicant: ChampionX USA Inc., Sugarland, TX (US)

(72) Inventors: Carl Engelbert Reiners, GH Borne (NL); Emma Catherine Harvey, BA Enschede (NL); Gerrit Beert van Dijk, KV Delden (NL)

(73) Assignee: ChampionX USA Inc., Sugar Land, TX (US)

( * ) Notice: Subject to any disclaimer, the term of this patent is extended or adjusted under 35 U.S.C. 154(b) by 4 days.

(21) Appl. No.: 16/623,493

(22) PCT Filed: May 25, 2018

(86) PCT No.: PCT/IB2018/053743
§ 371 (c)(1),
(2) Date: Dec. 17, 2019

(87) PCT Pub. No.: WO2018/234907
PCT Pub. Date: Dec. 27, 2018

(65) Prior Publication Data
US 2020/0199438 A1 Jun. 25, 2020

(30) Foreign Application Priority Data
Jun. 19, 2017 (GB) ..................... 1709767

(51) Int. Cl.
*C09K 8/524* (2006.01)

(52) U.S. Cl.
CPC .......... *C09K 8/524* (2013.01); *C09K 2208/32* (2013.01)

(58) Field of Classification Search
CPC .......... C09K 8/524; C09K 8/52; C09K 8/528; C09K 8/536; C09K 2208/32; C10G 29/00;
(Continued)

(56) References Cited

U.S. PATENT DOCUMENTS 3,765,849 A * 10/1973 Ilnyckyj ................ C10L 1/1973
44/397
3,997,469 A * 12/1976 Howie ................... C10G 75/02
252/392

(Continued)

FOREIGN PATENT DOCUMENTS

| WO | 2006025912 A2 | 3/2006 |
| WO | 2007065107 A2 | 6/2007 |

(Continued)

OTHER PUBLICATIONS

McClure, Ted, Hexion's VERSATIC Acid 10, Jun. 6, 2018, retrieved Apr. 1, 2021 from https://blog.sealandchem.com/versatic-acid-10-hexion (Year: 2018).*

(Continued)

*Primary Examiner* — Angela M DiTrani Leff
(74) *Attorney, Agent, or Firm* — Stinson LLP

(57) ABSTRACT

A method for the use of a monocarboxylic acid composition additive to inhibit formation of naphthenic deposits from crude oil is described. The invention provides for the inhibition of naphthenic using environmentally acceptable compositions, reducing waste water contamination. In use of the monocarboxylic acid compositions, the requirements for further additives, such as emulsion breakers, may also be reduced or eliminated.

18 Claims, 2 Drawing Sheets

(58) Field of Classification Search
CPC ...... C10G 31/00; C10G 39/20; C10G 39/205; C10G 17/00; C10G 17/02; C10G 17/04; C10G 33/04; C10G 2300/44
See application file for complete search history.

(56) References Cited

U.S. PATENT DOCUMENTS

| | | | | |
|---|---|---|---|---|
| 4,497,702 A * | 2/1985 | Miller | ............... | C10L 1/224 252/392 |
| 4,738,795 A * | 4/1988 | Farnand | ............... | C10G 33/04 210/708 |
| 4,778,589 A * | 10/1988 | Reynolds | ............... | C10G 21/16 208/309 |
| 4,853,109 A * | 8/1989 | Reynolds | ............... | C10G 17/02 585/866 |
| 4,988,433 A * | 1/1991 | Reynolds | ............... | C10G 17/04 585/866 |
| 5,078,858 A * | 1/1992 | Hart | ............... | C10G 29/22 208/252 |
| 5,336,438 A * | 8/1994 | Schilling | ............... | C08L 95/005 106/284.4 |
| 5,439,592 A * | 8/1995 | Bellos | ............... | C02F 1/441 210/639 |
| 5,612,093 A * | 3/1997 | Braig | ............... | C07F 7/003 427/386 |
| 5,789,463 A * | 8/1998 | Odagiri | ............... | G02B 1/043 524/529 |
| 6,559,104 B2 * | 5/2003 | Sartori | ............... | C09K 8/54 166/902 |
| 6,849,581 B1 * | 2/2005 | Thompson | ............... | C11D 3/2075 507/103 |
| 7,776,931 B2 * | 8/2010 | Venter | ............... | C10G 29/20 507/90 |
| 8,366,915 B2 * | 2/2013 | Goliaszewski | ............... | C10G 53/02 208/252 |
| 10,358,609 B2 * | 7/2019 | Grande | ............... | C10G 53/10 |
| 10,760,008 B2 * | 9/2020 | Legaspi Felipe | ............... | C08L 95/005 |
| 2003/0013621 A1 * | 1/2003 | Sartori | ............... | C09K 8/54 508/459 |
| 2003/0056431 A1 * | 3/2003 | Schwab | ............... | C10L 10/04 44/419 |
| 2003/0201207 A1 * | 10/2003 | Eaton | ............... | C10G 17/00 208/265 |
| 2004/0045875 A1 * | 3/2004 | Nguyen | ............... | B01D 17/047 208/251 R |
| 2005/0197267 A1 * | 9/2005 | Zaki | ............... | C11D 1/66 510/245 |
| 2005/0241997 A1 * | 11/2005 | Kremer | ............... | C10G 33/04 208/265 |
| 2006/0157387 A1 * | 7/2006 | Humblot | ............... | C10G 75/02 208/255 |
| 2010/0029514 A1 | 2/2010 | Berry et al. | | |
| 2010/0137167 A1 * | 6/2010 | Hellsten | ............... | C10G 29/22 507/90 |
| 2012/0283147 A1 * | 11/2012 | Vijn | ............... | C10G 29/20 507/90 |
| 2015/0011445 A1 * | 1/2015 | Temme | ............... | C11D 7/3209 510/264 |
| 2017/0051211 A1 * | 2/2017 | Kim | ............... | C10G 53/06 |
| 2017/0145222 A1 * | 5/2017 | Zha | ............... | C07D 233/24 |
| 2017/0210972 A1 * | 7/2017 | Williamson | ............... | E21B 43/2408 |
| 2018/0066174 A1 * | 3/2018 | Mukerjee | ............... | C09K 8/32 |
| 2019/0330514 A1 * | 10/2019 | Chen | ............... | E21B 21/068 |

FOREIGN PATENT DOCUMENTS

| | | | | |
|---|---|---|---|---|
| WO | WO-2007065107 A2 * | 6/2007 | ............ | C09K 8/524 |
| WO | WO-2007086661 A1 * | 8/2007 | ............ | C10G 29/02 |
| WO | 2008/155333 A1 | 12/2008 | | |
| WO | 2011063459 A1 | 6/2011 | | |
| WO | WO-2011063459 A1 * | 6/2011 | ............ | C09K 8/524 |

OTHER PUBLICATIONS

Bretherton et al. Impact of Acetic Acid on Weld Corrosion and its Mitigation, 2009, NACE International, Corrosion 2009 Conference & Expo, Paper No. 09562 (Year: 2009).*

Ostojic et al., Mitigation of Napthenate Related Production Upsets in High Tan Crude Oil, 2012, Rio Oil & Gas Expo and Conference (Year: 2012).*

Baugh, T.D. et al., The Discovery of High-Molecular-Weight Naphthenic Acids (ARN Acid) Responsible for Calcium Naphthenate Deposits, Society of Petroleum Engineers Inc. SPE93011 (2005), 7 pages.

Goldszal, Alexandre et al., Scale and Naphthenate Inhibition in Deep-Offshore Fields, Society of Petroleum Engineers Inc. SPE74661 (2002), 11 pages.

Simon, Sebastien et al., Determination of C80 tetra-acid content in calcium naphthenate deposits, Journal of Chromatography A, 1200 (2008) pp. 136-143.

* cited by examiner

NAPHTHENATE INHIBITION

CROSS-REFERENCE TO RELATED APPLICATION

This application is a 371 US National which claims priority to PCT/IB2018/053743 filed May 25, 2018, which claims priority to GB 1709767.6 filed Jun. 19, 2017, the disclosure of which is incorporated herein by reference in its entirety.

FIELD OF THE INVENTION

The invention relates to the field of crude oil production, transport and processing. In particular the invention concerns the inhibition of naphthenic and similar deposits.

BACKGROUND TO THE INVENTION

The build-up of waxy solid or viscous deposits in crude oil production facilities is a well-known problem. This can lead to restriction and blockage of pipelines and deposits may also impair the operation of valves and other apparatus in a production facility, requiring costly downtime for its removal.

The deposits are prone to form as a consequence of the changing conditions (principally pH, temperature and pressure) that production fluids are subjected to when pumped from a subsea or subterranean well. They are generally considered to result from interaction of carboxylate anions with dissolved cations in the connate or interstitial water, at the oil/water interface, resulting in the precipitation of carboxylate salts and/or the formation of stable water-in-oil emulsions.

The deposits may contain a range of chemical species, but are principally associated with the presence of medium to high molecular weight carboxylates that are naturally present in crudes, in particular the so called "naphthenic acids". Naphthenic acids are blends of carboxylic acids (most typically comprising cyclohexyl, cyclopentyl and/or aromatic moieties) with typically 10-90 carbon atoms and 0 to 6 rings, and up to 4 carboxylate groups. The waxy and sludge-like deposits are commonly referred to as "naphthenates" as a consequence.

Naphthenate formation is particularly problematic in crude having high concentrations of such species, i.e. a high total acid number (TAN). The TAN is a measurement of the overall acidity of a crude, expressed as the amount of potassium hydroxide in milligrams that is needed to neutralize one gram of oil. A highly acidic crude is generally considered to be a crude having a TAN of around or above 1. Some crudes are known to have TAN in the range as high as 3-4.

Naphthenate formation may also be associated with high concentrations of inorganic salts (e.g. calcium and magnesium salts) in the associated aqueous phase. An increase in the pH of the aqueous phase resulting from evolution of dissolved carbon dioxide is also known to lead to naphthenate formation. Together, these factors are thought to lead to the interaction between metal ions and carboxylate anions at the oil/water interface, and the consequent stabilisation of that interface and formation of stable solid or highly viscous emulsions. Carboxylates may also interact relatively strongly with metal surfaces, such that the deposits adhere to the internal surfaces of a production facility.

Additives are commonly introduced into the crude oil to inhibit naphthenate formation. Formulations comprising phosphate or sulphate surfactants, such as phosphate esters or DDBSA (dodecylbenzenesulfonic acid), have been used for this purpose.

Phosphates act to "out compete" carboxylate species at the oil/water interface. However, it is undesirable for phosphates to be released into the environment, since they are associated with toxic algal blooms and the like, leading to progressively greater regulatory control over their use in recent years. Use of phosphate inhibitors can therefore significantly increase waste treatment costs. Moreover, additives of this type may be associated with increased corrosion within refineries and production facilities.

In addition, additives with surfactant properties may stabilise oil-in-water emulsions and hinder separation of the oil and water phases. Indeed use of surfactants has even been proposed to exacerbate the problem by carrying complexed metal ions into the oil phase (Goldszal et al., Society of Petroleum Engineers publication no. SPE 74661, 2002).

Where oil-in-water emulsion formation this becomes problematic, emulsion breakers (such as alcohols and/or ethoxylate solutions) must be added in the crude oil separation process—adding to overall cost and environmental impact.

Existing treatments to prevent the formation of naphthenates include the injection of large volumes of acid, such as acetic acid, in order to decrease the pH of the oil and water phases. However, a continuous injection of about 100 to 1000 parts per million (ppm) of acetic acid is required to achieve a pH sufficiently low to be effective (typically below at least 6.0 and sometimes even below 5.2 for high TAN crudes). However, acetic acid is very corrosive and presents various health, safety, and environmental issues. Furthermore, the sheer volume of acetic acid solution that is necessary represents a significant storage and supply problem, especially on offshore oil production platforms. Also, lowering the pH of the produced waters may lead to serious internal corrosion of the crude oil processing equipment.

Accordingly, there remains a need for means to reduce or inhibit naphthenic deposits which addresses or mitigates one or more of these issues.

SUMMARY OF THE INVENTION

According to a first aspect of the invention there is provided the use of a monocarboxylic acid as an additive to inhibit formation of naphthenic deposits from a fluid comprising crude oil, wherein the monocarboxylic acid is a branched $C_8$-$C_{12}$ monocarboxylic acid.

The invention extends in a second aspect to a method of inhibiting the formation of naphthenic deposits, comprising adding a monocarboxylic acid composition to a fluid comprising crude oil, wherein the monocarboxylic acid composition comprises is a branched $C_8$-$C_{12}$ monocarboxylic acid.

The monocarboxylic acid may be a saturated monocarboxylic acid (by which we mean the carboxylic acid may comprise only single carbon-carbon bonds). The monocarboxylic acid may be unsaturated (by which we mean that the carboxylic acid may comprise one or more carbon-carbon double or triple bonds). The monocarboxylic acid may include a cyclic group, such as a cycloalkane, cycloalkane or an aromatic ring).

In some embodiments, the monocarboxylic acid is a branched C8 monocarboxylic acid, such as an ethylhexanoic acid. The monocarboxylic acid may be 2-ethylhexanoic acid.

In some embodiments, the monocarboxylic acid is a branched $C_{12}$ monocarboxylic acid, such as a butyloctanoic acid. The monocarboxylic acid may be 2-butylocanoic acid.

The invention also extends to the use of a blend of carboxylic acids. The monocarboxylic acid composition may comprise a blend of carboxylic acids.

The blend may comprise one or more branched $C_8$-$C_{12}$ monocarboxylic acids.

The blend may comprise one or more isomers of a branched $C_n$ monocarboxylic acid, where n=8-12. One such blend is a "neodecanoic acid" (also available commercially as Versatic Acid 10, where Versatic is a Trade Mark).

Neodecanoic acid is a blend decanoic acids, wherein the C2 carbon (i.e. the α-carbon) is tertiary or quaternary. The components have the general chemical structure:

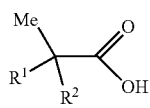

wherein $R^1$ is H or $C_n$ alkyl and $R^2$ is H or $C_m$ alkyl, where n and m are 1 to 7 and n+m=7

Neodecanoic acid may comprise approximately equal amounts of 2,2,3,5-tetramethylhexanoic acid, 2,4-dimethyl-2-isopropylpentanoic acid, 2,5-dimethyl-2-ethylhexanoic acid, 2,2-dimethyloctanoic acid and 2,2-diethylhexanoic acid.

The blend may comprise one or more additional components such as carboxylic acids with fewer or a greater number of carboxylic acids, or one or more straight chain carboxylic acids.

By a monocarboxylic acid we refer to a carboxylic acid comprising a single carboxylic acid group.

By "branched" monocarboxylic acid, we refer to a carboxylic acid having at least one tertiary or quaternary carbon atom. In contrast, a straight chain carboxylic acid comprises only primary and secondary carbon atoms.

Reference herein to "naphthenic deposits" include deposits formed from naturally occurring carboxylate species present in crude oil, including deposits comprising carboxylate salt precipitates and/or water-in-oil emulsions stabilized by carboxylates. Such deposits may be solid or highly viscous. Naphthenic deposits include deposits formed from naphthenic acids and their carboxylates. The term naphthenic acids refers herein to naturally occurring saturated or unsaturated straight chain or branched carboxylic acid, and/or carboxylic acids comprising one or more cyclic moieties including 5- and 6-membered aliphatic rings or aromatic rings. Naphthenic acids include monocarboxylic acids (i.e. having a single carboxylate moiety) as well as di-, tri- and tetra-protic carboxylates and other species comprising multiple carboxylate groups. A given crude oil typically comprises a wide range of such species. Moreover, naphthenic deposits may also comprise other species present in crude oil (including but not limited to asphaltene fractions), or other inorganic species as might be carried in a production fluid.

The fluid may be a production fluid, from a subterranean or subsea well. A production fluid typically comprises crude oil and in addition an aqueous phase having natural inorganic materials dissolved therein. One or more small molecules, such as carbon, nitrogen and sulphur oxides may be dissolved in the aqueous and/or crude oil phase. A production fluid may also include solid particles, carried from the well in the fluid flow.

The fluid may have been processed, for example to remove at least a portion of the aqueous phase and/or particulate matter. The fluid may have been allowed to settle and/or degas. It will be understood that the composition of the fluid may change during such processing. For example, the pH of the aqueous phase of a production fluid may change as a consequence of one or more dissolved species precipitating or evolving therefrom. The pH of the aqueous component of a production fluid may for example initially be in the region of 4-6, but rise to a pH in the region of 6-9 following evolution of gasses such as $CO_2$ as pressure and temperature are reduced.

Similarly, volatile species may evaporate from the crude oil phase during processing.

The monocarboxylic acid composition may be added "neat". For example, a monocarboxylic acid (or a blend comprising one or more such acids) may in its pure form be a liquid, which can be added directly to the fluid comprising crude oil.

The monocarboxylic acid composition may be a component part of a naphthenate inhibiting formulation. For example, the formulation may comprise a carboxylic acid solution. The formulation may be aqueous. The formulation may comprise an organic solvent or co-solvent. An organic solvent/co-solvent may be present to increase the formulation's solubility in or miscibility with crude oil. Any suitable organic solvent, co-solvent or blend thereof may be used, for example as currently known in use with demulsifier formulations. For example, aromatic solvents such as heavy aromatic naphtha, light aromatic naphtha, xylene, naphthalene etc., or aliphatic solvents like Shellsol D-60 (Shellsol is a trade mark), or alcohols such as 2-ethylhexanol, or glycol ethers such as EGMBE, etc.

The invention may obviate the need to add a demulsifier (either as part of the formulation or at a later stage of the production process).

Desirably the resulting pH (i.e. of the inhibited fluid to which the monocarboxylic acid composition has been added) is neutral, or weakly acidic or weakly basic.

The pH of inhibited fluid may be the range of around 6-10. The pH of the inhibited fluid may be at least 6, or at least 7 (e.g. in the range of around 7-10, or 7-9). The pH of the inhibited fluid may be at least 8 (e.g. in the range of around 8-10, or 8-9). The pH of the inhibited fluid may be in the range of 7.5-8.5. The pH may be around 7.5, 7.7, 8.2 or 8.3 (±0.2).

The pH of the inhibited fluid to which the monocarboxylic acid composition has been added, is in the range of around 3-6, or 3-5.

The pH of the inhibited fluid may initially be lower, for example in the range of between around 3-5, and may subsequently increase. For example, in crude oil production, pH may increase due to the release of dissolved gasses including carbon dioxide. Accordingly, the inventive composition may be added upstream of where such degassing occurs, so as to be present when the pH increases to a value at which naphthenate deposition would otherwise occur (typically about around pH 6). Accordingly the method may comprise adding the monocarboxylic acid composition to a fluid comprising crude oil, to form an inhibited fluid having a first pH (e.g. in the range of 3-5), wherein the pH of the inhibited fluid subsequently increases to a second pH (e.g. in a range as disclosed above).

It will be understood that, where we refer to herein to the pH of the fluid comprising crude oil, the pH value reflects the pH of the aqueous phase. Typically, this is evaluated from samples of the aqueous component that has been separated from the oil phase, during the production process.

The monocarboxylic acid composition may be added at a concentration of less than 500 ppm (by mass) in the fluid comprising crude oil, or at less than 150 ppm, or less than 50 ppm, and optionally even less than 25 ppm. The monocarboxylic acid composition may be added at a concentration in the range of around 1-600 ppm, or in the range of around 1-200 ppm, or 1-100 ppm, or 1-60 ppm, or 1-30 ppm. The monocarboxylic acid composition may be added at a concentration in the range of around 10-60 ppm, or 10-30 ppm.

It will be understood that the required concentration of the monocarboxylic acid composition will depend on the nature of a particular crude oil, and so will vary depending on factors such as the TAN, water content and droplet sizes within mixed oil/water fluids.

The monocarboxylic acid may be added at a constant rate, or in batches.

The step of adding the monocarboxylic acid composition may be conducted at any suitable stage of crude oil production, transportation or processing. The method may comprise injecting the monocarboxylic acid composition downhole, dosing the monocarboxylic acid composition to an oil-water separator, or providing the monocarboxylic acid composition at another desirable point. Optionally, the composition may be added as the oil and water mixture forming the production fluid is being produced from a formation.

The composition may be added before a choke, manifold, turret, or a combination thereof. That is to say, the method may comprise addition the monocarboxylic acid composition to a fluid comprising crude oil at more than one stage. For example, it may be desirable to add a first amount (at a constant rate or in batches) of the composition at a first point of a fluid flow, and a second amount of the composition at at least one second point. The properties of a fluid may for example change during a crude oil production process (e.g. increasing pH, degassing due to reducing pressure and the like) such that additional inhibition of naphthenic deposition is required. Moreover it may be more convenient to add a balance of the monocarboxylic acid composition at a second location.

The method may include, after adding the composition, reducing the pressure to release carbon dioxide gas (and optionally other dissolved species) from the production fluid. For example by injecting into the production fluid downhole, and reducing the pressure by flowing the production fluid to the surface. Alternatively, the method may include reducing the pressure on the mixture to release carbon dioxide gas from the production fluid before adding the composition. Indeed the composition can be added during the pressure reduction/degassing process.

The invention extends in further aspects to an inhibitor formulation comprising a monocarboxylic acid composition, and to an inhibited production fluid comprising amounts of a monocarboxylic acid composition, as described above in relation to the first and second aspects. Moreover, it will be understood that preferred and optional features of each aspect of the invention correspond to preferred and optional features of each other aspect of the invention.

DESCRIPTION OF THE FIGURES

The invention will now be described with reference to the following figures in which.

DETAILED DESCRIPTION OF EXAMPLE EMBODIMENTS

Figure 1:
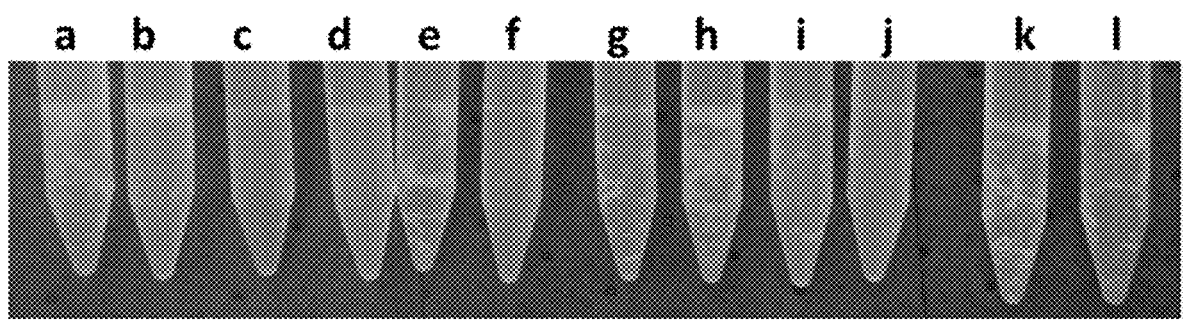
FIG. 1 is a photograph of vials of samples of test inhibitor compositions subjected to the vial test.

A range of tests were performed on a range of test inhibitor compositions, including candidate monocarboxylic acid compositions, and compositions including known naphthenate inhibitors, including acetic acid, and selected di-carboxylic acid, straight-chain carboxylic acid and higher molecular weight carboxylic acid compositions. Candidate monocarboxylic acid compositions were selected in part based on availability and pricing. These will be significant considerations for industrial scale use of new naphthenate inhibiting monocarboxylic acid compositions or formulations.

Three test protocols were carried out;
(i) the vial test;
(ii) the gravimetric test; and
(iii) confirmation tests on crude oil samples.

The "vial test", is a quick qualitative screening test. The gravimetric test provides a quantitative and comparative measure of the effectiveness of inhibition of a test solution of a model naphthenic acid. The effectiveness of naphthenate inhibition has also been confirmed in tests on crude oil samples, to mimic field conditions.

Details of the experimental protocols are set out below.
EXPERIMENTAL
Vial Test

The vial test is a quick screening test, performed by mixing an ARN/xylene solution with an aqueous calcium chloride solution, in the presence of each test inhibitor composition.

ARN acids are a family of high molecular weight tetraprotic naphthenic acids with high propensity to form naphthenic deposits in the presence of calcium ions.

The ARN acids are a family of $C_{80}$ tetra-protic carboxylic acids containing between 4-8 aliphatic rings of MW in the range 1227-1235. ARN acids have a dendrimeric structure with a fatty acid chain (each having 1-2 of the rings) extending to each acid moiety from an ethylene bridge. A description of ARN acids associated with naphthenate deposits is set out in the Society of Petroleum Engineers paper by Mediaas, Wolf, Baugh and Vinstad, SPE 93011, 2005; to which the skilled reader is directed.

A high ARN sample was extracted from a sample of a calcium naphthenate deposit obtained from the field. The method of extraction and measurement of ARN content by HPLC used, is set out by Simon et al., Journal of Chromatography A, 120 (2008) 136-143.

The vial test experiments were performed as follows:
Equipment
14.5 ml test tubes
Camera
Chemicals
Solution 1: 2.5% NaCl+1% $CaCl_2$ solution
Solution 2: 500 ppm ARN in Xylene (ppm by mass)
Buffer 1: 10% $Na_2CO_3$
Test inhibitor composition Method
1) Determine how much of the buffer 1 solution is required to increase the pH of solution 1 to 8.3 (±0.2)
2) Add inhibitor composition to test tube
3) Add 4 mL of solution 2 to the test tube
4) Mix
5) Add 4 mL of solution 1 to the test tube
6) Add the required amount of the buffer 1 solution determined in step 1)
7) Seal and invert the test tube 10 times
8) Photograph test tube contents If calcium naphthenate precipitation is fully inhibited the test tube would contain distinct oil and water phases, both of which are clear. Any calcium naphthenate appears as a white precipitate in the lower aqueous phase.

Gravimetric Test

The gravimetric test is a filtration test to measure the amount of calcium naphthenate formed. The amount of deposit is indicative of the effectiveness of the inhibitor Equipment
100 ml powder bottles
Vacuum filtration setup for 47 mm filters
Whatman glass fibre filter type GF/C (Whatman is a trade mark of GE Healthcare)
10 ml syringe with long needle Chemicals
Solution 3: 3% NaCl 1% CaCl aqueous solution
Solution 2: 500 ppm ARN in Xylene
Buffer 2: 1 mM MOPS (3-(N-morpholino)propanesulfonic acid)+NaOH aqueous solution pH 7.7 (±0.1)
Test inhibitor composition Method
1) Add inhibitor composition to bottle, 500 ppm
2) Add 40 mL of solution 2 to bottle
3) Mix
4) Add 35 mL solution 3 to bottle
5) Add 5 mL of Buffer 2 directly into aqueous layer in bottle
6) Invert the bottle 10 times
7) Leave to rest (10 min)
8) Take pictures
9) Decant and filter organic layer
10) Record pH of aqueous layer
11) Filter aqueous layer through same filter paper as used in step 9).
12) Wash bottle and filter paper with xylene, water, acetone (in sequence) to ensure full transfer.
13) Oven dry in oven (50° C. for 1 hour).

Confirmation Test

To confirm that the inhibitor is performing in condition closer to field conditions, the confirmation test was performed on a sample of a naphthenic light crude oil from West Africa with a TAN of 3 mg KOH/g crude oil. The crude oil sample contained lower concentrations of ARN than used in the vial and gravimetric tests. For the purposes of this test, 50 ppm ARN was therefore added to the crude increase the measurability of the formed deposits.

Equipment and Chemicals
Graduated 200 ml bottles
Vacuum filtration setup for 47 mm filters
Whatman glass fiber filter type GF/C
Thermostatic water bath Chemicals
Solution 4: Brine—2.7% NaCl, 0.21% CaCl2.2H2O, 0.68% MgCl2.6H2O, 0.04% KCl in demineralized water
Solution 5: 50 ppm naphthenic acid in a crude oil sample
Buffer 3: 5% $Na_2CO_3$ aqueous solution Test inhibitor compositions
Emulsotron CC9506-NL, obtained from Sevron Safety Solutions, Preston, UK. (Emulsotron is a trade mark). This product is a blend of alkoxylated resins and polymers.
Xylene
Acetone
7% HCl solution
Demineralized water Method
1) Weigh filter
2) Determine the amount of Buffer 3 solution needed to reach pH 7.5±0.1
3) Add 60 mL solution 5 to the bottle
4) Add 40 mL solution 4 to the bottle
5) Heat bottles to 55° C. in a water bath
6) Shake for 10 minutes at 255 rpm to form an emulsion
7) Add inhibitor composition to the bottle (see Table 3 for amount in ppm)
8) Add 25 ppm of the demulsifier product CC9506-NL to bottle and shake for 1 minute at 100 rpm
9) Add required amount of buffer solution determined in step 2) and shake for 1 minute at 100 rpm
10) Place the bottle in the water bath at 55° C.
11) Filter bottle contents, with vacuum pump assistance. In order to reduce viscosity and thus filtering time, filtering was conducted having first heated the contents of the bottles to 60° C.
12) Wash bottle and filter paper with Xylene to ensure complete transfer
13) Turn off vacuum pump
14) Add 3 ml 7% HCl to filter, turn on vacuum pump
15) Wash with excess of demineralized water within 5 seconds
16) Wash with acetone
17) Dry in oven (50° C. for 1 hour)
18) Weigh the filter In each of the tests, the combination of the two solutions (i.e. solutions 1 and 2 in the vial test, solutions 2 and 3 in the gravimetric test, and solutions 4 and 5 in the confirmation test) are facsimiles of a production fluid.

Interfacial Tests

Surface tension measurements were obtained using a KSV NIMA CAM200 Optical Tensiometer (KSV NIMA is a trade mark of Biolin Scientific), as follows:

A cuvette was filled with a 2.5% NaCl, 1% $CaCl_2*2\ H_2O$ solution in demineralized water, a syringe is filled with a test solution of inhibitor in xylene. Where the test inhibitor compound was insoluble in xylene, inhibitor was instead dissolved in the aqueous phase. In all cases the inhibitor was dissolved at 0.5% (w/w).

A droplet was made of the xylene in the 2.5% NaCl, 1% $CaCl_2*2\ H_2O$ solution. Interfacial tension was determined from the droplet shape, using the software the supplied with the CAM200 instrument.

Results and Discussion

The test inhibitor compositions are listed in Table 1.

TABLE 1

| Code | Chemistry |
|---|---|
| In1 | 2-Ethylhexanoic acid |
| In2 | Acrylic acid ester |
| In3 | Isodecyl acrylate |
| In4 | Dodecanoic acid |
| In5 | Methacrylic acid 2-dimethylaminoethyl ester |

TABLE 1-continued

| Code | Chemistry |
| --- | --- |
| In6 | Acetic Acid |
| In7 | Versatic ™ Acid 10 (neodecanoic acid) |
| In8 | Caproic (hexanoic) acid |
| In9 | Carprylic (octanoic) Acid |
| In10 | Isocarb ™ 12 (2 butyl-octanoic acid) |
| In11 | Isocarb ™ 16 (2-hexyl-decanoic acid) |
| In12 | Isocarb ™ 20 (2-octyl-dodecanoic acid) |

Vial test results are shown in FIG. 1, on the following samples as labelled in the figure:
a) Blank
b) DDBSA
c) phosphate ester inhibitor
d) In1
e) In4
f) In6
g) In7
h) In8
i) In9
j) In10
k) In11
l) In12

In this qualitative test, 2-ethylhexanoic acid showed the greatest potential to inhibit the formation of the naphthenic deposits. The DDBSA and phosphate ester inhibitor samples are known inhibitors and provide in effect a performance baseline.

Figure 2:
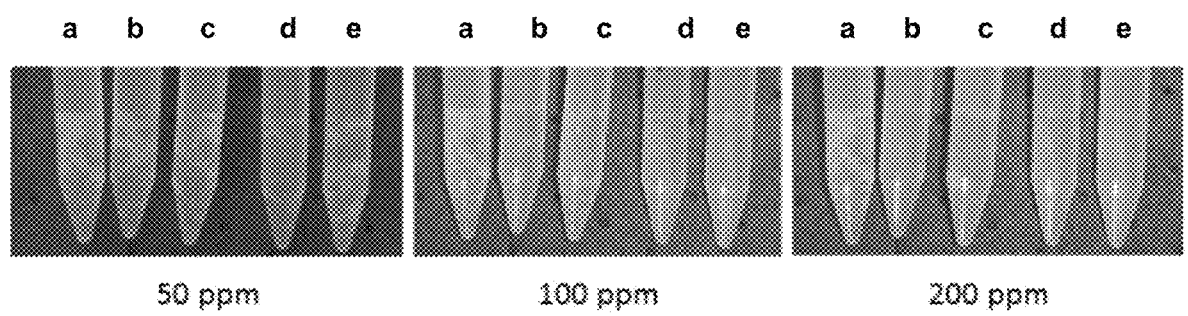
FIG. 2 shows photographs of samples of (a) a blank sample (b) a phosphate ester inhibitor, comprising an approximately equimolar amounts of 2-ethylhexyl mono- and di-phosphate ester (hereinafter referred to as "phosphate ester inhibitor") and (c)-(e) test inhibitor compositions, subjected to the vial test at concentrations of 50 ppm, 100 ppm and 200 ppm.

FIG. 2 shows the results of vial tests conducted on (a) a blank sample (b) phosphate ester inhibitor (c) sample In1 (d) sample In 6 and (e) sample In 10. Each test was conducted at 50 ppm, 100 ppm and 200 ppm of the inhibitor compositions, as indicated in the Figure.

Samples In 1, In 6 and In 10 showed comparable performance at 200 ppm and 100 ppm, and all three samples show some degree of inhibition of naphthenic deposit formation (in comparison to the blank sample) at these concentrations. Naphthenic deposits are evident in all samples at 50 ppm and the qualitative vial test cannot definitively distinguish between them.

The vial test results provide a comparison between branched and straight chain monocarboxylic acids. For example the In 1 (branched C8) sample shows less naphthenic deposition than the In 9 sample (straight chain C8). Similarly, the In 10 sample (branched C12 monocarboxylic acid) shows less naphthenic deposition than the In 4 sample (straight chain C12 monocarboxylic acid).

Based upon the vial test results, the gravimetric test was conducted on the most promising test compositions.

Gravimetric test results are set out in Table 2.

TABLE 2

| | Inhibitor | Deposit Weight (mg) |
| --- | --- | --- |
| 1 | Blank | 11 |
| 2 | Phosphate ester inhibitor | 2 |
| 3 | DDBSA | 4 |
| 4 | In 1 | 4 |
| 5 | In 4 | 8 |
| 6 | In 6 | 4 |
| 7 | In 7 | 6 |
| 8 | In 8 | 7 |
| 9 | In 10 | 3 |
| 10 | In 11 | 9 |
| 11 | In 12 | 6 |

These data show that In 1 (2-ethylhexanoic acid—a branched $C_8$ monocarboxylic acid) and In 10 (2 butyl-octanoic acid—a branched $C_{12}$ monocarboxylic acid) have comparable performance (or, in the case of In 10, slightly better performance) as acetic acid, a known and industrially accepted inhibitor of naphthenic acid deposits. The versatic acid sample (a monocarboxylic acid composition comprising a blend of branched $C_{10}$ monocarboxylic acids) also shows acceptable inhibition performance.

The presence of the buffer maintains the pH of each of the tests above the pH at which calcium naphthenate formation would otherwise occur (which for the materials used on the tests described herein occurs at pH 6.2).

Although of comparable performance, in practice and in the absence of a buffer solution, the monocarboxylic acid compositions of the present invention can be expected to have higher $pK_a$ values and so have less effect on the pH of the resulting inhibited fluids. In turn this is likely to lead to less corrosion in production facilities.

Similarly, due to their higher molecular weights, the monocarboxylic acid compositions are less volatile than acetic acid, and so storage and shipping is less problematic than for acetic acid.

Results of the confirmation test are shown in Table 3.

TABLE 3

| Expt. No. | Sample | ppm | Deposit weight (g) |
| --- | --- | --- | --- |
| 1 | Blank | 0 | 16 |
| 2 | Phosphate ester | 25 | 5 |
| 3 | inhibitor | 50 | 7 |
| 4 | 2-ethylhexanoic acid | 25 | 6 |
| 5 | | 50 | 5 |
| 6 | Sebacic acid | 25 | 8 |
| 7 | | 50 | 5 |
| 8 | Acetic acid | 25 | 9 |
| 9 | | 50 | 6 |

Based on the results of the test found in table 3, all of the test samples show some degree of naphthenate inhibition. Comparable results were shown for the phosphate ester inhibitor, sebacic acid (a $C_8$ dicarboxylic acid) and acetic acid, at 50 ppm. However, at a lower concentration (25 ppm), 2-ethylhexanoic acid was shown to be the most effective inhibitor of naphthenic deposits.

Interfacial tension results are set out in table 4.

| Chemicals | Interfacial tension (mN/m) | Solvent |
| --- | --- | --- |
| Blank (no inhibitor) | 37 | |
| 2-Ethylhexanoic acid | 27 | Xylene |
| Acrylic acid ester | 35 | Xylene |
| Isodecyl acrylate | 32 | Xylene |
| Dodecanoic acid | 23 | Xylene |
| AMPS | 27 | Xylene |
| Acetic Acid | 30 | 2.5% NaCl, 1% $CaCl_2$*2 $H_2O$ solution |
| Versatic ™ Acid 10 (neodecanoic acid) | 21 | Xylene |
| Isocarb ™ 12 (2 butyl-octanoic acid) | 31 | Xylene |
| Isocarb ™ 16 (2-hexyl-decanoic acid) | 27 | Xylene |

The blank sample without inhibitor was measured to create a base line. After this several inhibitors were measured in the same setup. As acetic acid is soluble in water and xylene, there will be diffusion between both the phases, which might cause the measured interfacial tension to drop. Most reliable and stable results were obtained when dissolving the acetic acid in the water. However these data may suggest a higher interfacial activity for acetic acid than is actually the case.

These data show that the branched $C_8$, $C_{10}$, $C_{12}$ and indeed $C_{16}$ monocarboxylic acids tested are surface-active, (as indeed are straight-chain fatty acids such as dodecanoic acid).

Together with the buffered tests disclosed above (which indicate that the observed inhibition cannot be attributed merely to lowering of pH), these IFT results infer that other factors may be associated with the beneficial properties of the branched $C_8$-$C_{12}$ carboxylates, and that their behaviour at the oil-water interface may be significant.

Whilst not wishing to be bound by theory, it is considered that branched species act at the oil/water interface to disrupt the formation of "bridged" structures that might otherwise lead to the formation of extended networks of naphthenate salts.

What is claimed is:

1. A method of inhibiting the formation of naphthenic deposits, comprising adding a monocarboxylic acid to a fluid comprising crude oil to form an inhibited fluid, wherein the monocarboxylic acid consists of a branched $C_8$-$C_{12}$ monocarboxylic acid; and wherein the formation of naphthenic deposits is inhibited, wherein naphthenic deposits comprise deposits formed from naturally occurring carboxylate species present in crude oil including deposits comprising carboxylate salt precipitates and water-in-oil emulsions stabilized by carboxylates.

2. The method according to claim 1, wherein the branched $C_8$-$C_{12}$ monocarboxylic acid is a saturated monocarboxylic acid.

3. The method according to claim 1, wherein the branched $C_8$-$C_{12}$ monocarboxylic acid is a branched $C_8$ monocarboxylic acid, or wherein the monocarboxylic acid is a branched $C_{12}$ monocarboxylic acid.

4. The method according to claim 1, wherein the monocarboxylic acid comprises a blend of branched $C_8$-$C_{12}$ monocarboxylic acids.

5. The method according to claim 4, wherein the blend of branched $C_8$-$C_{12}$ monocarboxylic acids is neodecanoic acid.

6. The method according to claim 1, wherein the monocarboxylic acid is added neat to the fluid comprising crude oil.

7. The method according to claim 1, wherein the pH of the inhibited fluid to which the monocarboxylic acid has been added, is from about 6 to about 10.

8. The method according to claim 7, wherein the pH of the inhibited fluid is from about 7.5 to about 8.5.

9. The method of claim 1, wherein the pH of the inhibited fluid to which the monocarboxylic acid has been added, is from about 3 to about 5.

10. The method according to claim 1, wherein the monocarboxylic acid is added at a concentration of from about 1 to about 600 ppm (by mass) to the fluid comprising crude oil.

11. The method according to claim 10, wherein the monocarboxylic acid is added at a concentration of from about 1 to about 100 ppm to the fluid comprising crude oil.

12. The method according to claim 1, comprising injecting the monocarboxylic acid downhole, dosing the monocarboxylic acid to an oil-water separator, or a combination thereof.

13. The method of claim 1, wherein the fluid is a production fluid from a subterranean or subsea well.

14. The method according to claim 1, wherein the fluid has been (i) processed to remove at least a portion of an aqueous phase, particulate matter, or a combination thereof; or (ii) allowed to settle, degas, or a combination thereof.

15. A method of inhibiting the formation of naphthenic deposits, comprising adding a monocarboxylic acid to a fluid comprising crude oil to form an inhibited fluid, wherein the monocarboxylic acid consists of a branched $C_8$-$C_{12}$ monocarboxylic acid; and wherein the formation of naphthenic deposits is inhibited, wherein naphthenic deposits comprise deposits formed from naturally occurring carboxylate species present in crude oil including deposits comprising carboxylate salt precipitates and water-in-oil emulsions stabilized by carboxylates, and wherein the branched $C_8$-$C_{12}$ monocarboxylic acid is 2-ethylhexanoic acid or 2-butyloctanoic acid.

16. A method of inhibiting the formation of naphthenic deposits, comprising adding a monocarboxylic acid to a fluid comprising crude oil to form an inhibited fluid, wherein the monocarboxylic acid consists of a branched $C_8$-$C_{12}$ monocarboxylic acid; and wherein the formation of naphthenic deposits is inhibited, wherein naphthenic deposits comprise deposits formed from naturally occurring carboxylate species present in crude oil including deposits comprising carboxylate salt precipitates and water-in-oil emulsions stabilized by carboxylates, further comprising adding the monocarboxylic acid to the fluid comprising crude oil, to form the inhibited fluid having a first pH, wherein the pH of the inhibited fluid subsequently increases to a second pH.

17. The method of claim 16, wherein the first pH is from about 3 to about 5 and wherein the second pH is from about 6 to about 10.

18. The method of claim 17, wherein the pH of the inhibited fluid increases when dissolved carbon dioxide is released from the inhibited fluid.

* * * * *